United States Patent
Zhao

(10) Patent No.: US 12,028,864 B2
(45) Date of Patent: Jul. 2, 2024

(54) DATA TRANSMISSION METHOD, DEVICE, SYSTEM AND STORAGE MEDIUM

(71) Applicant: Beijing Xiaomi Mobile Software Co., Ltd., Beijing (CN)

(72) Inventor: Qun Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/980,675

(22) PCT Filed: Apr. 2, 2018

(86) PCT No.: PCT/CN2018/081639
§ 371 (c)(1),
(2) Date: Sep. 14, 2020

(87) PCT Pub. No.: WO2019/191878
PCT Pub. Date: Oct. 10, 2019

(65) Prior Publication Data
US 2021/0029735 A1    Jan. 28, 2021

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0053* (2013.01); *H04L 5/006* (2013.01); *H04L 5/0091* (2013.01);
(Continued)

(58) Field of Classification Search
None
See application file for complete search history.

(56) References Cited

U.S. PATENT DOCUMENTS 11,425,752 B2 * 8/2022 Adjakple ............... H04W 72/14
2015/0334036 A1   11/2015 Cao
(Continued)

FOREIGN PATENT DOCUMENTS

| CN | 102421192 A | 4/2012 |
| CN | 102638852 A | 8/2012 |

(Continued)

OTHER PUBLICATIONS

Huawei et al., LCP with multiple Numerologies, 3GPP TSG-RAN WG2 #97bis, Spokane, Washington, USA, Apr. 3-7, 2017 (Year: 2017).*

(Continued)

*Primary Examiner* — Joseph A Bednash
(74) *Attorney, Agent, or Firm* — Finnegan, Henderson, Farabow, Garrett & Dunner, L.L.P.

(57) ABSTRACT

Disclosed in the present disclosure are a data transmission method, a device, a system and a storage medium, belonging to the technical field of wireless communication. The method includes: determining, after receiving an uplink grant sent by a base station, a target level of quality of service, wherein the target level of quality of service is a level of quality of service of data scheduled by the uplink grant; acquiring target uplink data from uplink data to be sent, a level of quality of service of the target uplink data being consistent with the target level of quality of service; and sending the target uplink data through an uplink resource indicated by the uplink grant. The data transmission method provided by the embodiment of the present disclosure can ensure the efficiency of uplink data transmission.

3 Claims, 11 Drawing Sheets

(51) Int. Cl.
*H04W 28/02* (2009.01)
*H04W 72/543* (2023.01)

(52) U.S. Cl.
CPC ..... *H04W 28/0268* (2013.01); *H04W 72/543* (2023.01)

(56) References Cited

U.S. PATENT DOCUMENTS

| | | | |
|---|---|---|---|
| 2016/0227564 A1 | 8/2016 | Stephenne et al. | |
| 2018/0132268 A1* | 5/2018 | Zhang | H04W 72/21 |
| 2018/0270697 A1* | 9/2018 | Turtinen | H04W 72/569 |
| 2018/0279358 A1* | 9/2018 | Babaei | H04W 72/14 |
| 2019/0182896 A1* | 6/2019 | Shrestha | H04W 72/14 |
| 2019/0313375 A1 | 10/2019 | Loehr et al. | |
| 2019/0313438 A1* | 10/2019 | Zhang | H04L 5/0044 |
| 2019/0364586 A1* | 11/2019 | Li | H04W 72/1268 |
| 2019/0380153 A1* | 12/2019 | Damnjanovic | H04L 5/0044 |
| 2020/0187174 A1* | 6/2020 | Tang | H04W 72/1268 |
| 2020/0351946 A1* | 11/2020 | Pang | H04W 72/042 |
| 2020/0367276 A1* | 11/2020 | Kwak | H04L 1/0072 |
| 2020/0389922 A1* | 12/2020 | Xu | H04W 76/27 |

FOREIGN PATENT DOCUMENTS

| | | |
|---|---|---|
| CN | 103152289 A | 6/2013 |
| CN | 104219740 A | 12/2014 |
| CN | 107113851 A | 8/2017 |
| WO | WO 2017/171912 A1 | 10/2017 |
| WO | WO 2018/006313 A1 | 1/2018 |
| WO | WO 2018/031638 A | 2/2018 |

OTHER PUBLICATIONS

3GPP TS 36.321 V13.4.0 (Dec. 2016); 3rd Generation Partnership Project; Technical Specification Group Radio Access Network; Evolved Universal Terrestrial Radio Access (E-UTRA); Medium Access Control (MAC) protocol specification (Release 13), pp. 39-40 (Year: 2016).*

International Search Report in the International Application No. PCT/CN2018/081639, mailed on Dec. 29, 2018.

LG Electronics Inc.; "QOS provision in radio interface", 3GPP TSG-RAN WG2 Meeting #96, R2-168279, Reno, USA, Nov. 14-Nov. 18, 2016, 2 pages.

Extended European Search Report in European Application No. 18913892.8, mailed on Oct. 29, 2021.

Examination Report of Indian Application No. 202047046677, issued on Dec. 15, 2021.

English translation of Written Opinion of the International Search Authority in International Application No. PCT/CN2018/081639, mailed on Dec. 29, 2018.

* cited by examiner

DATA TRANSMISSION METHOD, DEVICE, SYSTEM AND STORAGE MEDIUM

CROSS REFERENCE TO RELATED APPLICATIONS

This application is a national phase application based on International Application No. PCT/CN2018/081639, filed Apr. 2, 2018, the content of which is incorporated herein by reference.

TECHNICAL FIELD

The present disclosure generally relates to the technical field of wireless communication, and more particularly, to a data transmission method, device and system, and a storage medium.

BACKGROUND

In a wireless communication system, user equipment (UE) needs to send a scheduling request (SR) to a base station before sending each piece of uplink (UL) data, and the SR may include a level of quality of service (QoS) of the UL data to be sent by the UE. After receiving the SR, the base station may send a UL grant to the UE based on the level of QoS to schedule the UL data to be sent by the UE, and the UL grant may indicate a transmission configuration parameter. The UE may transmit the UL data based on the transmission configuration parameter. The transmission configuration parameter may include a time-frequency position of a UL resource allocated to the UE by the base station, a modulation and coding scheme for the UL data, and the like.

In related art, after receiving a certain UL grant, UE may transmit multiple pieces of UL data to be sent in a sequence from high to low levels of QoS and based on a transmission configuration parameter indicated by the UL grant.

However, when a level of QoS of UL data scheduled by a UL grant is inconsistent with a level of QoS of UL data transmitted by UE based on the UL grant, the data transmission rate may be reduced or the data transmission reliability may not be high enough, resulting in influence on the UL data transmission efficiency of the UE.

SUMMARY

The present disclosure provides a data transmission method, device and system, and a storage medium, which may ensure the UL data transmission efficiency of UE.

According to a first aspect of embodiments of the present disclosure, a data transmission method is provided, which may include: after receiving a UL grant sent by a base station, a target level of QoS is determined, and the target level of QoS is a level of QoS of data scheduled by the UL grant; target UL data is acquired from UL data to be sent, a level of QoS of the target UL data is consistent with the target level of QoS; and the target UL data is sent through a UL resource indicated by the UL grant.

Optionally, the operation that the target level of QoS is determined may include: target level indication information sent by the base station is received; and the target level of QoS is determined according to the target level indication information.

Optionally, the operation that the target level indication information sent by the base station is received may include: the target level indication information sent by the base station through high-layer signaling is received.

Optionally, the operation that the target level indication information sent by the base station is received may include: the target level indication information sent by the base station through target downlink control information (DCI) is received, and the target DCI includes the UL grant.

Optionally, the operation that the target level of QoS is determined according to the target level indication information may include: a corresponding relationship table sent by the base station is received, and the corresponding relationship table includes at least one piece of level indication information and corresponding level of QoS; the corresponding relationship table is queried according to the target level indication information, a level of QoS corresponding to the target level indication information is obtained; and the level of QoS corresponding to the target level indication information is determined as the target level of QoS.

Optionally, the target level indication information may be configured to indicate a logical channel to which the data scheduled by the UL grant belongs, and the operation that the target level of QoS is determined according to the target level indication information may include: the target level of QoS is determined according to the logical channel to which the data scheduled by the UL grant belongs.

Optionally, the UL grant may be included in target DCI, and the operation that the target level of QoS is determined may include: an aggregation level of a physical downlink control channel (PDCCH) transmitting the target DCI is determined; and the target level of QoS is determined according to the aggregation level.

Optionally, the UL grant may be included in target DCI, and the operation that the target level of QoS is determined may include: a control resource set (CORESET) to which the PDCCH transmitting the target DCI belongs is determined; and the target level of QoS is determined according to the CORESET.

Optionally, the UL grant may be included in target DCI, and the operation that the target level of QoS is determined may include: a search space position of the target DCI is determined; and the target level of QoS is determined according to the search space position.

Optionally, the UL grant may be included in target DCI, and the operation that the target level of QoS is determined may include: a format of the target DCI is determined; and the target level of QoS is determined according to the format.

Optionally, the UL grant may be included in target DCI, and the operation that the target level of QoS is determined may include: a hybrid automatic repeat request (HARQ) process identifier included in the target DCI is acquired; and the target level of QoS is determined according to the HARQ process identifier.

Optionally, the operation that the target level of QoS is determined may include: a moment when the UL grant is received is determined; the data scheduled by the UL grant is determined according to the moment when the UL grant is received; and a highest level of QoS of the data scheduled by the UL grant is determined as the target level of QoS.

Optionally, the operation that the data scheduled by the UL grant is determined according to the moment when the UL grant is received may include: UL data to be sent by UE at the moment is determined as the data scheduled by the UL grant; or, UL data to be sent by the UE at a target moment is determined as the data scheduled by the UL grant, a time interval between the target moment and the moment is equal to a sum of a delay of UL scheduling of the base station and a delay of processing of the UL grant by the UE, and the target moment is prior to the moment.

Optionally, the operation that the target UL data is acquired from the UL data to be sent may include: first UL data of which a level of QoS is equal to the target level of QoS is acquired from the UL data to be sent; in response to a data volume of the first UL data greater than or equal to a capacity of the UL resource indicated by the UL grant, data in a data volume equal to the capacity of the UL resource is intercepted from the first UL data, and the intercepted data is acquired as the target UL data; and in response to the data volume of the first UL data less than the capacity of the UL resource, UL data is sequentially acquired from the UL data to be sent in a sequence from high to low levels of QoS until a sum of data volumes of the acquired UL data and the first UL data is equal to the capacity of the UL resource, and the acquired UL data and the first UL data are acquired as the target UL data.

Optionally, the method may further include: in response to the UL data to be sent comprising no UL data with a level of QoS consistent with the target level of QoS, a rescheduling request is sent to the base station, and the rescheduling request is configured to instruct the base station to send a new UL grant to the UE.

According to a second aspect of embodiments of the present disclosure, a data transmission method is provided, which may include: a UL grant is sent to UE; and target level indication information is sent to the UE, the target level indication information is configured to indicate a target level of QoS, and the target level of QoS is a level of QoS of data scheduled by the UL grant. The UE may be configured to acquire target UL data from UL data to be sent according to the target level indication information and send the target UL data through a UL resource indicated by the UL grant, and a level of QoS of the target UL data may be consistent with the target level of QoS.

Optionally, the operation that the target level indication information is sent to the UE may include: the target level indication information is sent to the UE through high-layer signaling.

Optionally, the operation that the target level indication information is sent to the UE may include: the target level indication information is sent to the UE through target DCI, and the target DCI includes the UL grant.

Optionally, the method may further include: a corresponding relationship table is sent to the UE, and the corresponding relationship table includes at least one piece of level indication information and corresponding level of QoS. The UE may be configured to query the corresponding relationship table according to the target level indication information, obtain a level of QoS corresponding to the target level indication information, and determine the level of QoS corresponding to the target level indication information as the target level of QoS.

Optionally, the target level indication information may be configured to indicate a logical channel to which the data scheduled by the UL grant belongs; and the UE may be configured to determine the target level of QoS according to the logical channel to which the data scheduled by the UL grant belongs.

According to a third aspect of embodiments of the present disclosure, a data transmission device is provided, which may include: a determination module, configured to, after receiving a UL grant sent by a base station, determine a target level of QoS, the target level of QoS being a level of QoS of data scheduled by the UL grant; an acquisition module, configured to acquire target UL data from UL data to be sent, a level of QoS of the target UL data being consistent with the target level of QoS; and a data sending module, configured to send the target UL data through a UL resource indicated by the UL grant.

Optionally, the determination module may include: a receiving submodule, configured to receive target level indication information sent by the base station; and a determination submodule, configured to determine the target level of QoS according to the target level indication information.

Optionally, the receiving submodule may be configured to receive the target level indication information sent by the base station through high-layer signaling.

Optionally, the receiving submodule may be configured to receive the target level indication information sent by the base station through target DCI, and the target DCI may include the UL grant.

Optionally, the determination submodule may be configured to receive a corresponding relationship table sent by the base station, the corresponding relationship table comprising at least one piece of level indication information and corresponding level of QoS, query the corresponding relationship table according to the target level indication information, obtain a level of QoS corresponding to the target level indication information, and determine the level of QoS corresponding to the target level indication information as the target level of QoS.

Optionally, the target level indication information may be configured to indicate a logical channel to which the data scheduled by the UL grant belongs, and the determination submodule may be configured to determine the target level of QoS according to the logical channel to which the data scheduled by the UL grant belongs.

Optionally, the UL grant may be included in target DCI, and the determination module may be configured to determine an aggregation level of a PDCCH transmitting the target DCI and determine the target level of QoS according to the aggregation level.

Optionally, the UL grant may be included in target DCI, and the determination module may be configured to determine a CORESET to which the PDCCH transmitting the target DCI belongs and determine the target level of QoS according to the CORESET.

Optionally, the UL grant may be included in target DCI, and the determination module may be configured to determine a search space position of the target DCI and determine the target level of QoS according to the search space position.

Optionally, the UL grant may be included in target DCI, and the determination module may be configured to determine a format of the target DCI and determine the target level of QoS according to the format.

Optionally, the UL grant may be included in target DCI, and the determination module is configured to acquire a HARQ process identifier included in the target DCI and determine the target level of QoS according to the HARQ process identifier.

Optionally, the determination module may include: a moment determination submodule, configured to determine a moment when the UL grant is received; a data determination submodule, configured to determine the data scheduled by the UL grant according to the moment when the UL grant is received; and a level determination submodule, configured to determine a highest level of QoS of the data scheduled by the UL grant as the target level of QoS.

Optionally, the data determination submodule may be configured to determine UL data to be sent by UE at the moment as the data scheduled by the UL grant, or, determine UL data to be sent by the UE at a target moment as the data scheduled by the UL grant. A time interval between the target moment and the moment may be equal to a sum of a delay of UL scheduling of the base station and a delay of processing of the UL grant by the UE, and the target moment may be prior to the moment.

Optionally, the acquisition module may be configured to acquire first UL data of which a level of QoS is equal to the target level of QoS from the UL data to be sent, in response to a data volume of the first UL data greater than or equal to a capacity of the UL resource indicated by the UL grant, intercept data in a data volume equal to the capacity of the UL resource from the first UL data and acquire the intercepted data as the target UL data, and in response to the data volume of the first UL data less than the capacity of the UL resource, sequentially acquire UL data from the UL data to be sent in a sequence from high to low levels of QoS until a sum of data volumes of the acquired UL data and the first UL data is equal to the capacity of the UL resource and acquire the acquired UL data and the first UL data as the target UL data.

Optionally, the device may further include a request sending module, and the request sending module may be configured to, in response to the UL data to be sent comprising no UL data with a level of QoS consistent with the target level of QoS, send a rescheduling request to the base station, and the rescheduling request may be configured to instruct the base station to send a new UL grant to the UE.

According to a fourth aspect of embodiments of the present disclosure, a data transmission device is provided, which may include: a grant sending module, configured to send a UL grant to UE; and an information sending module, configured to send target level indication information to the UE. The target level indication information may be configured to indicate a target level of QoS, and the target level of QoS may be a level of QoS of data scheduled by the UL grant. The UE may be configured to acquire target UL data from UL data to be sent according to the target level indication information and send the target UL data through a UL resource indicated by the UL grant, and a level of QoS of the target UL data may be consistent with the target level of QoS.

Optionally, the information sending module may be configured to send the target level indication information to the UE through high-layer signaling.

Optionally, the information sending module may be configured to send the target level indication information to the UE through target DCI, and the target DCI may include the UL grant.

Optionally, the device may further include a table sending module; the table sending module may be configured to send a corresponding relationship table to the UE, and the corresponding relationship table may include at least one piece of level indication information and corresponding level of QoS. The UE may be configured to query the corresponding relationship table according to the target level indication information, obtain a level of QoS corresponding to the target level indication information, and determine the level of QoS corresponding to the target level indication information as the target level of QoS.

Optionally, the target level indication information may be configured to indicate a logical channel to which the data scheduled by the UL grant belongs, and the UE may be configured to determine the target level of QoS according to the logical channel to which the data scheduled by the UL grant belongs.

According to a fifth aspect of embodiments of the present disclosure, a data transmission device is provided, which may include: a processor; and a memory configured to store instructions executable by the processor. The processor may be configured to: after receiving a UL grant sent by a base station, determine a target level of QoS, the target level of QoS being a level of QoS of data scheduled by the UL grant; acquire target UL data from UL data to be sent, a level of QoS of the target UL data being consistent with the target level of QoS; and send the target UL data through a UL resource indicated by the UL grant.

According to a sixth aspect of embodiments of the present disclosure, a data transmission device is provided, which may include: a processor; and a memory configured to store instructions executable by the processor. The processor may be configured to: send a UL grant to UE; and send target level indication information to the UE, the target level indication information being configured to indicate a target level of QoS, the target level of QoS being a level of QoS of data scheduled by the UL grant. The UE may be configured to acquire target UL data from UL data to be sent according to the target level indication information and send the target UL data through a UL resource indicated by the UL grant, and a level of QoS of the target UL data may be consistent with the target level of QoS.

According to a seventh aspect of embodiments of the present disclosure, a data transmission system is provided, which may include any data transmission device in the third aspect and any data transmission device in the fourth aspect.

According to an eighth aspect of embodiments of the present disclosure, a computer-readable storage medium is provided, in which at least one instruction may be stored, the instruction being loaded and executed by a processor to implement any data transmission method in the first aspect, or, the instruction being loaded and executed by the processor to implement any data transmission method in the second aspect.

The technical solutions provided in the embodiments of the present disclosure may have the following beneficial effects.

After receiving the UL grant sent by the base station, the UE determines the level of QoS of the data scheduled by the UL grant and acquires the target UL data according to the level of QoS, and the level of QoS of the target UL data is consistent with the level of QoS of the data scheduled by the UL grant. The UE transmits the target UL data through the UL resource indicated by the UL grant. In such a manner, it may be ensured that the level of QoS of the UL data transmitted by the UE is consistent with the level of QoS of the data scheduled by the UL grant, such that the UL data transmission efficiency of the UE may be ensured.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
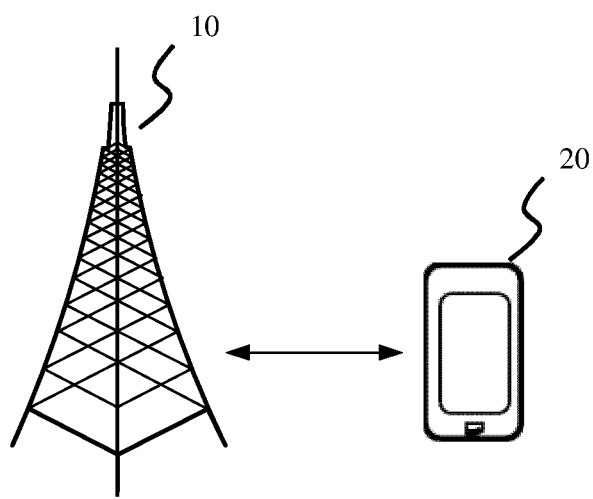
FIG. 1 is a schematic diagram illustrating an implementation environment, according to an exemplary embodiment.

For making the purposes, technical solutions and advantages of the present disclosure clearer, implementation modes of the present disclosure will further be described below in combination with the accompanying drawings in detail.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In a wireless communication system, when UE needs to send UL data to a base station, the UE may send an SR to the base station. The SR may be an SR and/or a buffer status report (BSR), etc. After receiving the SR, the base station may send a UL grant to the UE to schedule the UL data to be sent in/by the UE, and the UL grant is configured to indicate a time-frequency position of a UL resource allocated to the UE by the base station and configured to transmit the UL data, a modulation and coding scheme for the UL data, a multi-antenna setting, a power control solution, and the like. After receiving the UL grant, the UE may send the UL data based on the UL grant.

During a practical application, multiple pieces of UL data with different levels of QoS to be sent by the UE at the same time exist, and how the UE sends the UL data with different levels of QoS based on a UL grant is an important issue in a wireless communication system.

In a long term evolution (LTE) communication system, QoS (or a level of QoS) of UL data is mainly reflected by a transmission delay. That is, UL data with high QoS has a relatively high transmission delay requirement, and UL data with low QoS has a relatively low transmission delay requirement. Therefore, after receiving a UL grant transmitted by a base station, UE may preferentially transmit UL data with high QoS in a UL resource indicated by the UL grant to ensure a transmission delay requirement of the UL data with the high QoS. When the UL data with the high QoS does not occupy the whole UL resource, UL data with low QoS may be sent through the UL resource. It can thus be seen that, in the LTE communication system, the base station may schedule UL data with different levels of QoS by use of the same UL grant, and the UE determines sending priorities of the UL data according to the levels of QoS of the UL data.

In a fifth generation mobile communication technology (5G) communication system, QoS of UL data may be reflected by transmission reliability. That is, UL data with high QoS has a relatively high transmission reliability requirement, and UL data with low QoS has a relatively low transmission reliability requirement. Under a normal condition, different modulation and coding schemes, power control solutions and/or multi-antenna settings are adopted for transmission of UL data with different transmission reliability requirements. In general, if a modulation and coding scheme and the like for UL data with high transmission reliability are adopted to transmit UL data with low transmission reliability, communication resources may be wasted, and the transmission efficiency of the UL data may be influenced. When a modulation and coding scheme and the like for UL data with low transmission reliability are adopted to transmit UL data with high transmission reliability, a transmission reliability requirement of the UL data with the high transmission reliability may not be met, and the transmission efficiency of the UL data may be influenced.

Therefore, in the 5G communication system, for ensuring the transmission efficiency of UL data, a base station needs to schedule UL data with different levels of QoS by use of different UL grants. Modulation and coding schemes, multi-antenna settings, power control solutions and the like indicated by the UL grants for scheduling the UL data with different levels of QoS may be different and correspond to the level of QoS of the scheduled UL data. Optionally, in the 5G communication system, an SR sent to a base station by UE may include a level of QoS of UL data to be sent by the UE, such that the base station sends a UL grant to the UE based on the level of QoS included in the SR after receiving the SR.

Compared with the LTE communication system, a mechanism through which a base station sends a UL grant in the 5G communication system greatly changes, and thus an existing manner in the LTE communication system that UE determines a sending priority of UL data according to the level of QoS of the UL data to be sent is no more applicable to the 5G communication system. Since the level of QoS of UL data scheduled by a UL grant may be inconsistent with the level of QoS of UL data transmitted by the UE based on the UL grant if the manner in the LTE communication system is adopted, the transmission efficiency of the UL data may be affected.

The embodiments of the present disclosure provide a data transmission method. In the data transmission method, after receiving a UL grant sent by a base station, UE may determine a level of QoS of UL data scheduled by the UL grant and acquire target UL data according to the level of QoS. A level of QoS of the target UL data is consistent with the level of QoS of the UL data scheduled by the UL grant, and then the UE may transmit the target UL data through a UL resource indicated by the UL grant. In such a manner, it may be ensured that the level of QoS of the UL data transmitted by the UE is consistent with the level of QoS of the UL data scheduled by the UL grant, such that the UL data transmission efficiency of the UE may be ensured.

An implementation environment involved in the data transmission method will be described below in the embodiments of the present disclosure. As illustrated in FIG. 1, the implementation environment may include a base station 10 and UE 20, the base station 10 may be connected with the UE 20 through a communication network, and the UE 20 is any UE in a cell served by the base station 10. The communication network may be a 5G communication network, and may also be an LTE communication system or another communication network similar to the LTE communication network or the 5G communication network.

Figure 2:
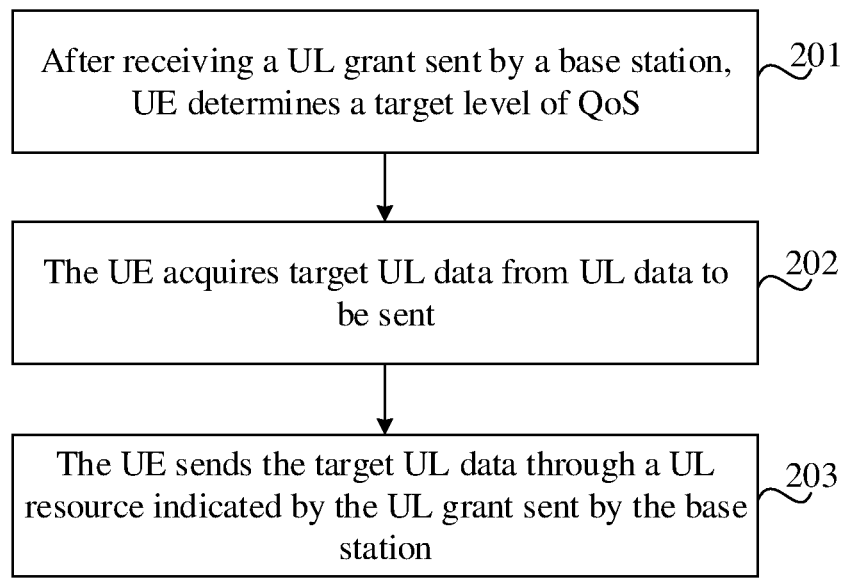
FIG. 2 is a flow chart showing a data transmission method, according to an exemplary embodiment.

FIG. 2 is a flow chart showing a data transmission method, according to an exemplary embodiment. The data transmission method is applied to the UE 20 in FIG. 1. As illustrated in FIG. 2, the data transmission method may include the following steps.

In step 201, after receiving a UL grant sent by a base station, the UE determines a target level of QoS.

The target level of QoS is a level of QoS of UL data scheduled by the UL grant sent by the base station.

In step 202, the UE acquires target UL data from UL data to be sent.

A level of QoS of the target UL data is consistent with the target level of QoS.

In step 203, the UE sends the target UL data through a UL resource indicated by the UL grant sent by the base station.

From the above, according to the data transmission method provided in the embodiment of the present disclosure, after receiving the UL grant sent by the base station, the UE determines the level of QoS of the data scheduled by the UL grant and acquires the target UL data according to the level of QoS. The level of QoS of the target UL data is consistent with the level of QoS of the data scheduled by the UL grant, and then the UE transmits the target UL data through the UL resource indicated by the UL grant. In such a manner, it may be ensured that the level of QoS of the UL data transmitted by the UE is consistent with the level of QoS of the data scheduled by the UL grant, such that the UL data transmission efficiency of the UE may be ensured.

Figure 3:
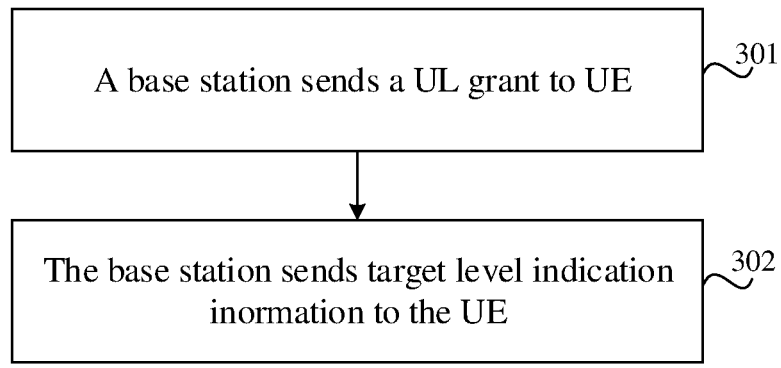
FIG. 3 is a flow chart showing a data transmission method, according to an exemplary embodiment.

FIG. 3 is a flow chart showing a data transmission method, according to an exemplary embodiment. The data transmission method is applied to the base station 10 in FIG. 1. As illustrated in FIG. 3, the data transmission method may include the following steps.

In step 301, the base station sends a UL grant to UE.

In step 302, the base station sends target level indication information to the UE.

The target level indication information is configured to indicate a target level of QoS, and the target level of QoS is a level of QoS of data scheduled by the UL grant sent by the base station.

The UE is configured to acquire target UL data from UL data to be sent according to the target level indication information and send the target UL data through a UL resource indicated by the UL grant sent by the base station, and a level of QoS of the target UL data is consistent with the target level of QoS.

From the above, according to the data transmission method provided in the embodiment of the present disclosure, the base station sends the target level indication information to the UE, and the target level indication information is configured to indicate the level of QoS of the data scheduled by the UL grant sent to the UE by the base station, such that the UE may acquire the target UL data according to the level of QoS and transmit the target UL data through the UL resource indicated by the UL grant, and the level of QoS of the target UL data is consistent with the level of QoS of the data scheduled by the UL grant. In such a manner, it may be ensured that the level of QoS of the UL data transmitted by the UE is consistent with the level of QoS of the data scheduled by the UL grant, such that the UL data transmission efficiency of the UE may be ensured.

Figure 4:
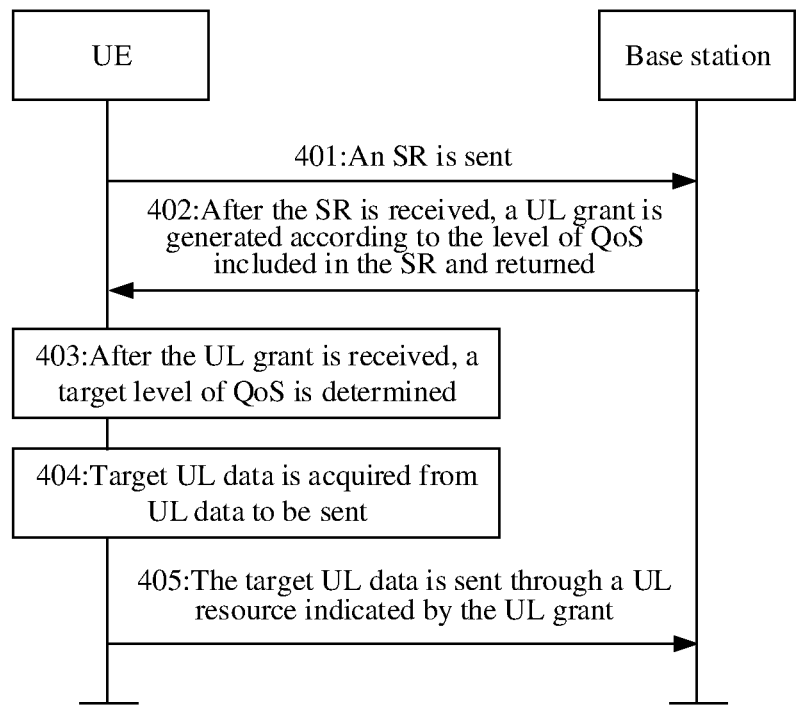
FIG. 4 is a flow chart showing a data transmission method, according to an exemplary embodiment.

FIG. 4 is a flow chart showing a data transmission method, according to an exemplary embodiment. The data transmission method is applied to the implementation environment in FIG. 1. As illustrated in FIG. 4, the data transmission method may include the following steps.

In step 401, UE sends an SR to a base station.

As mentioned above, the UE may send the SR to the base station when it needs to transmit UL data. The SR may be an SR and/or a BSR, etc., and the SR may include the level of QoS of the UL data to be sent by the UE. During a practical application, a level of QoS of a certain piece of data may be a level of QoS of a communication service to which the data belongs, and the level of QoS of the data may be represented with multiple indexes, for example, transmission reliability, a transmission delay, a maximum transmission rate or an average transmission rate. In the embodiment of the present disclosure, the level of QoS of the UL data may be represented with transmission reliability of the UL data, and the transmission reliability may usually be represented with a packet loss rate of the UL data.

In step 402, after receiving the SR sent by the UE, the base station generates a UL grant according to the level of QoS included in the SR and returns the UL grant to the UE.

After receiving the SR sent by the UE, the base station may extract the level of QoS from the SR and generate the UL grant according to the level of QoS. A modulation and coding scheme, multi-antenna setting, power control solution and the like indicated by the UL grant all correspond to the level of QoS. Then, the base station may send the UL grant to the UE.

In step 403, after receiving the UL grant sent by the base station, the UE determines a target level of QoS.

The target level of QoS is the level of QoS of UL data scheduled by the UL grant sent by the base station. The level of QoS of the UL data scheduled by the UL grant refers to a level of QoS on which the base station generates the UL grant based. For example, the level of QoS included in the SR sent by the UE is a level of QoS1, the base station generates a UL grant 1 based on the level of QoS1, and a level of QoS of UL data scheduled by the UL grant 1 is QoS1.

During practical implementation, the UE may determine the target level of QoS in multiple manners. Three exemplary manners in which the UE determines the target level of QoS will be presented below in the embodiment of the present disclosure.

In the first manner, the UE receives target level indication information sent by the base station and determines the target level of QoS according to the target level indication information.

Optionally, the target level indication information may directly indicate the target level of QoS and may also indirectly indicate the target level of QoS.

When the target level indication information directly indicates the target level of QoS, the UE may receive a corresponding relationship table sent by the base station, and the corresponding relationship table may include at least one piece of level indication information and corresponding level of QoS. The UE may query the corresponding relationship table sent by the base station according to the target level indication information, obtain a level of QoS corresponding to the target level indication information, and determine the level of QoS corresponding to the target level indication information as the target level of QoS.

Table 1 is an exemplary corresponding relationship table when level indication information occupies one bit. The level of QoS in Table 1 may be represented with the packet loss rate.

TABLE 1

| Level indication information | level of QoS (packet loss rate) |
|---|---|
| 0 | Less than or equal to $10^{-3}$ |
| 1 | Less than or equal to $10^{-5}$ |

Table 2 is an exemplary corresponding relationship table when level indication information occupies two bits. Similar to Table 1, the level of QoS in Table 2 may also be represented with the packet loss rate.

TABLE 2

| Level indication information | level of QoS (packet loss rate) |
|---|---|
| 00 | Less than or equal to $10^{-1}$ |
| 01 | Less than or equal to $10^{-3}$ |
| 10 | Less than or equal to $10^{-5}$ |

For example, in the corresponding relationship table in Table 1, when the target level indication information is "0", the UE may query the corresponding relationship table according to the value "0" to obtain that the level of QoS corresponding to the value "0" is that the packet loss rate is less than or equal to $10^{-3}$, and then the UE may acquire the target level of QoS to be that the packet loss rate is less than or equal to $10^{-3}$.

It is to be pointed out that the base station may send different corresponding relationship tables to different UE. For example, in a corresponding relationship table sent to UE1 by the base station, a level of QoS corresponding to level indication information "0" may be that the packet loss rate is less than or equal to $10^{-1}$, and a level of QoS corresponding to level indication information "1" may be that the packet loss rate is less than or equal to $10^{-3}$. In a corresponding relationship table sent to UE2 by the base station, a level of QoS corresponding to level indication information "0" may be that the packet loss rate is less than or equal to $10^{-3}$, and a level of QoS corresponding to level indication information "1" may be that the packet loss rate is less than or equal to $10^{-5}$. Therefore, when bits occupied by level indication information do not change, the diversity of the level of QoS indicated by the level indication information may be improved, and the system overhead may further be reduced.

When the target level indication information indirectly indicates the target level of QoS, the target level indication information may indicate a logical channel to which the UL data scheduled by the UL grant belongs. Under a normal condition, different logical channels are configured to transmit UL data of communication services with different levels of QoS, such that the UE may determine the target level of QoS according to the logical channel indicated by the target level indication information.

During practical implementation, the base station may send the target level indication information to the UE in different manners. Two optional manners in which the base station sends the target level indication information to the UE are provided in the embodiment of the present disclosure.

1. The base station sends the target level indication information to the UE through high-layer signaling.

The base station may send the high-layer signaling to the UE. For example, the high-layer signaling may be radio resource control (RRC) signaling or media access control (MAC) control element (CE) signaling. The high-layer signaling may include the target level indication information, and the base station may semi-statically indicate the target level of QoS through the target level indication information included in the high-layer signaling.

2. The base station sends the target level indication information to the UE through target DCI.

The target DCI includes the UL grant sent to the UE by the base station.

In the second manner, the UE determines the target level of QoS according to the target DCI.

In a possible implementation mode, the UE may determine an aggregation level of a PDCCH transmitting the target DCI and determine the target level of QoS according to the aggregation level.

Under a normal condition, a PDCCH with a relatively high aggregation level is configured to transmit DCI of a communication service with a relatively high transmission reliability requirement, and a PDCCH with a relatively low aggregation level is configured to transmit DCI of a communication service with a relatively low transmission reliability requirement. For example, a PDCCH of which an aggregation level is 16 is usually configured to transmit DCI of a communication service requiring the packet loss rate to be less than or equal to $10^{-5}$, and a PDCCH of which an aggregation level is 2 is usually configured to transmit DCI of a communication service requiring the packet loss rate to be less than or equal to $10^{-1}$. Therefore, the UE may determine a transmission reliability requirement of a communication service to which the target DCI belongs according to the aggregation level of the PDCCH transmitting the target DCI, and may further determine the target level of QoS according to the transmission reliability requirement of the communication service to which the target DCI belongs.

In another possible implementation mode, the UE may determine a CORESET to which the PDCCH transmitting the target DCI belongs and determine the target level of QoS according to the CORESET.

In a 5G communication system, a CORESET refers to a downlink resource including multiple PDCCHs. Under a normal condition, a CORESET may include one to three orthogonal frequency division multiplexing (OFDM) symbols in a time domain, and may include N physical resource blocks (PRBs) in a frequency domain, where N is a positive integer.

Optionally, the base station may send DCI through multiple CORESETs, different CORESETs correspond to communication services with different levels of QoS, and a certain CORESET is configured to bear the DCI of the corresponding communication service. Therefore, in the embodiment of the present disclosure, the UE may determine the CORESET to which the PDCCH transmitting the target DCI belongs, and then the UE may determine a level of QoS of a communication service corresponding to the CORESET and determine the level of QoS as the target level of QoS.

In another possible implementation mode, the UE may determine a search space position of the target DCI and determine the target level of QoS according to the search space position.

Optionally, different search space positions in the PDCCH may correspond to communication services with different levels of QoS, and a certain search space position is configured to bear the DCI of the corresponding communication service. Therefore, in the embodiment of the present disclosure, the UE may determine the search space position of the target DCI, determine a level of QoS of a communication service corresponding to the search space position, and determine the level of QoS as the target level of QoS.

In another possible implementation mode, the UE may determine a format of the target DCI and determine the target level of QoS according to the format of the target DCI.

Optionally, the communication system may configure different DCI formats for communication services with different levels of QoS. Therefore, in the embodiment of the present disclosure, the UE may determine the format of the target DCI and determine a level of QoS of a communication service to which the target DCI belongs according to the format of the target DCI, and then the UE may determine the level of QoS of the communication service to which the target DCI belongs as the target level of QoS.

In another possible implementation mode, the UE may acquire a HARQ process identifier included in the target DCI and determine the target level of QoS according to the HARQ process identifier.

Optionally, the target DCI may include the HARQ process identifier, and the HARQ process identifier is configured to indicate a HARQ process used when the UE reports a target HARQ to the base station. The target HARQ is configured to indicate whether the UE correctly receives target downlink data sent by the base station, and the target downlink data is downlink data of the communication service to which the target DCI belongs.

Under a normal condition, the UE may configure multiple HARQ processes (at most 16 HARQ processes may be configured), each HARQ process may be indicated by a unique HARQ process identifier, and different HARQ processes may correspond to communication services with different levels of QoS. The UE may transmit a HARQ of the communication service corresponding to a certain HARQ process by use of the HARQ process. Therefore, in the embodiment of the present disclosure, the UE may acquire the HARQ process identifier included in the target DCI and acquire a level of QoS of a communication service corresponding to the HARQ process identifier, and then the UE may determine the level of QoS of the communication service corresponding to the HARQ process identifier as the target level of QoS.

In the third manner, the UE determines the target level of QoS according to a moment when the UL grant sent by the base station is received.

The UE may acquire the moment (called a first moment hereinafter) when it receives the UL grant sent by the base station, determine the UL data scheduled by the UL grant according to the first moment, and then determine a highest level of QoS of the UL data scheduled by the UL grant as the target level of QoS.

Optionally, the UE may determine UL data to be sent by the UE at the first moment as the UL data scheduled by the UL grant, or, the UE may determine UL data to be sent by the UE at a target moment as the UL data scheduled by the UL grant. A time interval between the target moment and the first moment is equal to a sum of a delay of UL scheduling of the base station and a delay of processing of the UL grant by the UE, and the target moment is prior to the first moment.

For example, when the first moment is 12:00, under a condition, the UE may determine that UL data to be sent by the UE at 12:00 is UL data a and UL data b, and a level of QoS of the UL data a is higher than a level of QoS of the UL data b, such that the UE may determine the level of QoS of the UL data a as the target level of QoS. Under another condition, the UE may subtract a delay 1 s of UL scheduling of the base station and a delay 2 s of processing of the UL grant by the UE from 12:00 to obtain the target moment 11:59:57, and then the UE may determine that UL data to be sent by the UE at 11:59:57 is UL data c, UL data d and UL data e, and the level of QoS of the UL data c is highest, such that the UE may determine the level of QoS of the UL data c as the target level of QoS.

In step 404, the UE acquires target UL data from UL data to be sent.

A level of QoS of the target UL data is consistent with the target level of QoS. The term "consistent" refers to that the level of QoS of the target UL data is equal to the target level of QoS or part of UL data in the target UL data of which a level of QoS is equal to the target level of QoS.

Optionally, the UE may acquire first UL data of which a level of QoS is equal to the target level of QoS from the UL data to be sent. When a data volume of the first UL data is greater than or equal to a capacity of the UL resource indicated by the UL grant, the UE may intercept data in a data volume equal to the capacity of the UL resource from the first UL data and acquire the intercepted data as the target UL data. When the data volume of the first UL data is less than the capacity of the UL resource, the UE may sequentially acquire UL data from the UL data to be sent in a sequence from high to low levels of QoS until a sum of data volumes of the acquired UL data and the first UL data is equal to the capacity of the UL resource, and then the UE may acquire the acquired UL data and the first UL data as the target UL data. It is to be pointed out that the level of QoS of the UL data acquired from the UL data to be sent in the sequence from high to low levels of QoS is required to be less than the target level of QoS. It is also to be noted that "the capacity of the UL resource" refers to a maximum data volume of UL data that may be born in the UL resource.

For example, when the UL resource indicated by the UL grant is a UL resource A, a capacity of the UL resource A is 100 KB and the target level of QoS is that the packet loss rate is less than or equal to $10^{-3}$, the UE may acquire UL data h of which QoS is that the packet loss rate is less than or equal to $10^{-3}$ from the UL data to be sent, and the UL data h is the first UL data. When a data volume of the UL data h is 200 KB, the UE may intercept 100 KB data from the UL data h and acquire the intercepted data as the target UL data. When the data volume of the UL data h is 80 KB, the UE may sequence the UL data to be sent by itself in the sequence from high to low levels of QoS to obtain UL data j with a highest level of QoS except the UL data h, a data volume of the UL data j is 50 KB, and the UE may intercept data in a data volume 20 KB from the UL data j, and then the UE may acquire the UL data h and the data intercepted from the UL data j as the target UL data. Of course, when the data volume of the UL data j is less than 20 KB, the UE may continue acquiring UL data with a highest level of QoS except the UL data h and the UL data j, which will not be repeated in the embodiment of the present disclosure.

During practical implementation, when the UL data to be sent by the UE includes no UL data with a level of QoS consistent with the target level of QoS, for ensuring the transmission efficiency, the UE may send a rescheduling request to the base station. The rescheduling request may be an SR and/or a BSR. The rescheduling request may include the level of QoS of the UL data to be sent by the UE. Optionally, the rescheduling request may include the highest level of QoS of the UL data to be sent by the UE. The base station, after receiving the rescheduling request, may send a new UL grant to the UE based on the level of QoS included in the rescheduling request.

For example, when the target level of QoS is that the packet loss rate is less than or equal to $10^{-3}$ and the UL data to be sent by the UE includes no UL data of which a level of QoS is that the packet loss rate is less than or equal to $10^{-3}$, the UE may send the rescheduling request to the base station.

In step 405, the UE sends the target UL data to the base station through a UL resource indicated by the UL grant.

The UE may process the target UL data according to a modulation and coding scheme, multi-antenna setting and/or power control solution indicated by the UL grant, and may send the processed target UL data to the base station through the UL resource indicated by the UL grant.

From the above, according to the data transmission method provided in the embodiment of the present disclosure, after receiving the UL grant sent by the base station, the UE determines the level of QoS of the data scheduled by the UL grant and acquires the target UL data according to the level of QoS, and the level of QoS of the target UL data is consistent with the level of QoS of the data scheduled by the UL grant. The UE transmits the target UL data through the UL resource indicated by the UL grant. In such a manner, it may be ensured that the level of QoS of the UL data transmitted by the UE is consistent with the level of QoS of the data scheduled by the UL grant, such that the UL data transmission efficiency of the UE may be ensured.

Figure 5:
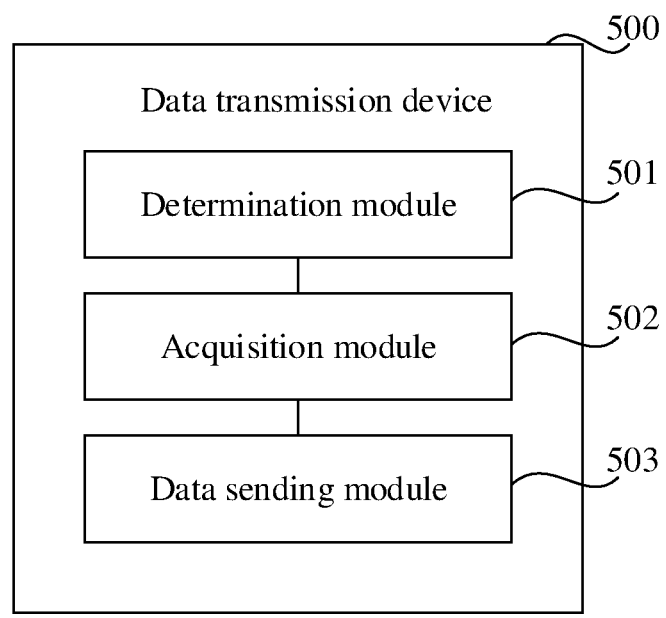
FIG. 5 is a block diagram of a data transmission device, according to an exemplary embodiment.

FIG. 5 is a block diagram of a data transmission device 500, according to an exemplary embodiment. The data transmission device 500 may be the UE 20 in FIG. 1. Referring to FIG. 5, the data transmission device 500 includes a determination module 501, an acquisition module 502 and a data sending module 503.

The determination module 501 is configured to, after receiving a UL grant sent by a base station, determine a target level of QoS, and the target level of QoS is a level of QoS of data scheduled by the UL grant.

The acquisition module 502 is configured to acquire target UL data from UL data to be sent, and a level of QoS of the target UL data is consistent with the target level of QoS.

The data sending module 503 is configured to send the target UL data through a UL resource indicated by the UL grant.

In an embodiment of the present disclosure, the determination module 501 includes: a receiving submodule and a determination submodule.

The receiving submodule is configured to receive target level indication information sent by the base station.

The determination submodule is configured to determine the target level of QoS according to the target level indication information.

In an embodiment of the present disclosure, the receiving submodule is configured to receive the target level indication information sent by the base station through high-layer signaling.

In an embodiment of the present disclosure, the receiving submodule is configured to receive the target level indication information sent by the base station through target DCI, and the target DCI includes the UL grant.

In an embodiment of the present disclosure, the determination submodule is configured to receive a corresponding relationship table sent by the base station, the corresponding relationship table including at least one piece of level indication information and corresponding level of QoS, query the corresponding relationship table according to the target level indication information, obtain a level of QoS corresponding to the target level indication information, and determine the level of QoS corresponding to the target level indication information as the target level of QoS.

In an embodiment of the present disclosure, the target level indication information is configured to indicate a logical channel to which the data scheduled by the UL grant belongs, and the determination submodule is configured to determine the target level of QoS according to the logical channel to which the data scheduled by the UL grant belongs.

In an embodiment of the present disclosure, the UL grant is included in the target DCI, and the determination module 501 is configured to determine an aggregation level of a PDCCH transmitting the target DCI and determine the target level of QoS according to the aggregation level.

In an embodiment of the present disclosure, the UL grant is included in the target DCI, and the determination module 501 is configured to determine a CORESET to which the PDCCH transmitting the target DCI belongs and determine the target level of QoS according to the CORESET.

In an embodiment of the present disclosure, the UL grant is included in the target DCI, and the determination module 501 is configured to determine a search space position of the target DCI and determine the target level of QoS according to the search space position.

In an embodiment of the present disclosure, the UL grant is included in the target DCI, and the determination module 501 is configured to determine a format of the target DCI and determine the target level of QoS according to the format.

In an embodiment of the present disclosure, the UL grant is included in the target DCI, and the determination module 501 is configured to acquire a HARQ process identifier included in the target DCI and determine the target level of QoS according to the HARQ process identifier.

In an embodiment of the present disclosure, the determination module 501 includes: a moment determination submodule, a data determination submodule and a level determination submodule.

The moment determination submodule is configured to determine a moment when the UL grant is received.

The data determination submodule is configured to determine the data scheduled by the UL grant according to the moment when the UL grant is received.

The level determination submodule is configured to determine a highest level of QoS of the data scheduled by the UL grant as the target level of QoS.

In an embodiment of the present disclosure, the data determination submodule is configured to determine UL data to be sent by UE at the moment as the data scheduled by the UL grant, or, determine UL data to be sent by the UE at a target moment as the data scheduled by the UL grant. A time interval between the target moment and the moment is equal to a sum of a delay of UL scheduling of the base station and a delay of processing of the UL grant by the UE, and the target moment is prior to the moment.

In an embodiment of the present disclosure, the acquisition module 502 is configured to acquire first UL data of which a level of QoS is equal to the target level of QoS from the UL data to be sent; when a data volume of the first UL data is greater than or equal to a capacity of the UL resource indicated by the UL grant, intercept data in a data volume equal to the capacity of the UL resource from the first UL data and acquire the intercepted data as the target UL data; when the data volume of the first UL data is less than the capacity of the UL resource, sequentially acquire UL data from the UL data to be sent in a sequence from high to low levels of QoS until a sum of data volumes of the acquired UL data and the first UL data is equal to the capacity of the UL resource and acquire the acquired UL data and the first UL data as the target UL data.

Figure 6:
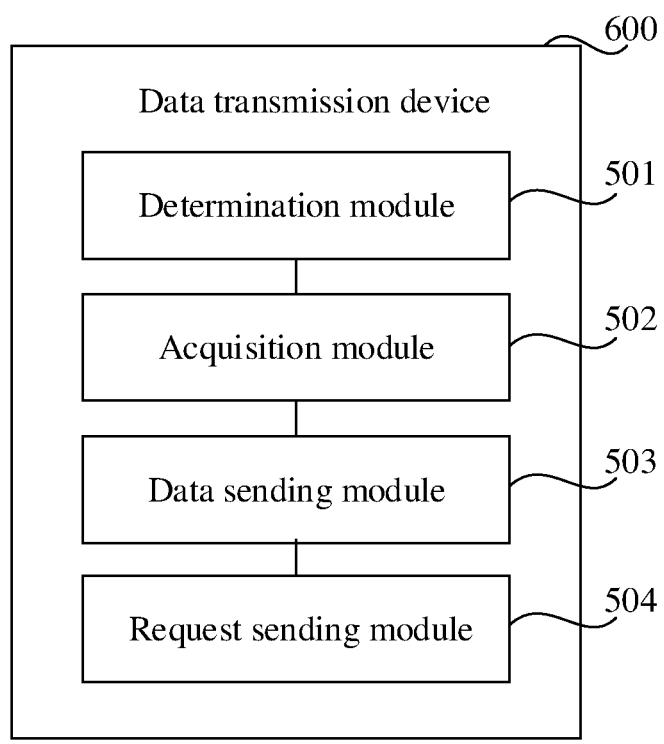
FIG. 6 is a block diagram of a data transmission device, according to an exemplary embodiment.

As illustrated in FIG. 6, an embodiment of the present disclosure also provides another data transmission device 600. Besides the modules in the data transmission device 500, the data transmission device 600 further includes a request sending module 504.

The data sending module 504 is configured to, when the UL data to be sent includes no UL data with a level of QoS consistent with the target level of QoS, send a rescheduling request to the base station, and the rescheduling request is configured to instruct the base station to send a new UL grant to the UE.

From the above, the data transmission device provided in the embodiment of the present disclosure, after receiving the UL grant sent by the base station, determines the level of QoS of the data scheduled by the UL grant, acquires the target UL data according to the level of QoS, the level of QoS of the target UL data being consistent with the level of QoS of the data scheduled by the UL grant, and then transmits the target UL data through the UL resource indicated by the UL grant. In such a manner, it may be ensured that the level of QoS of the UL data transmitted by the UE is consistent with the level of QoS of the data scheduled by the UL grant, such that the UL data transmission efficiency of the UE may be ensured.

With respect to the device in the above embodiment, the specific manners for performing operations for individual modules therein have been described in detail in the embodiment regarding the method, which will not be repeated herein.

Figure 7:
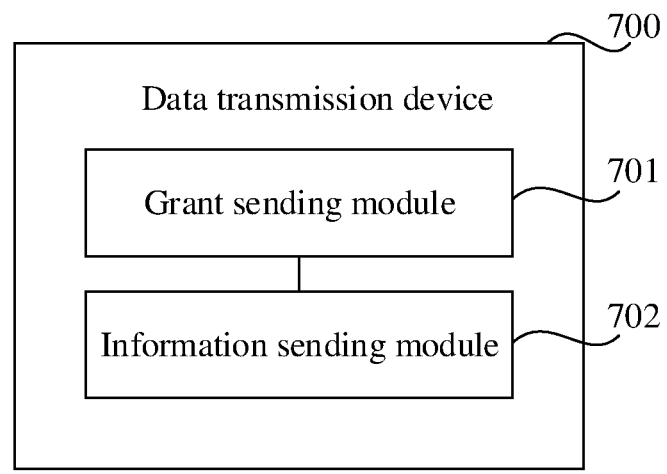
FIG. 7 is a block diagram of a data transmission device, according to an exemplary embodiment.

FIG. 7 is a block diagram of a data transmission device 700, according to an exemplary embodiment. The data transmission device 700 may be the base station 10 in FIG. 1. Referring to FIG. 7, the data transmission device 700 includes a grant sending module 701 and an information sending module 702.

The grant sending module 701 is configured to send a UL grant to UE.

The information sending module 702 is configured to send target level indication information to the UE, the target level indication information is configured to indicate a target level of QoS, and the target level of QoS is a level of QoS of data scheduled by the UL grant.

The UE is configured to acquire target UL data from UL data to be sent according to the target level indication information and send the target UL data through a UL resource indicated by the UL grant, and a level of QoS of the target UL data is consistent with the target level of QoS.

In an embodiment of the present disclosure, the information sending module 702 is configured to send the target level indication information to the UE through high-layer signaling.

In an embodiment of the present disclosure, the information sending module 702 is configured to send the target level indication information to the UE through target DCI, and the target DCI includes the UL grant.

In an embodiment of the present disclosure, the target level indication information is configured to indicate a logical channel to which the data scheduled by the UL grant belongs, and the UE is configured to determine the target level of QoS according to the logical channel to which the data scheduled by the UL grant belongs.

Figure 8:
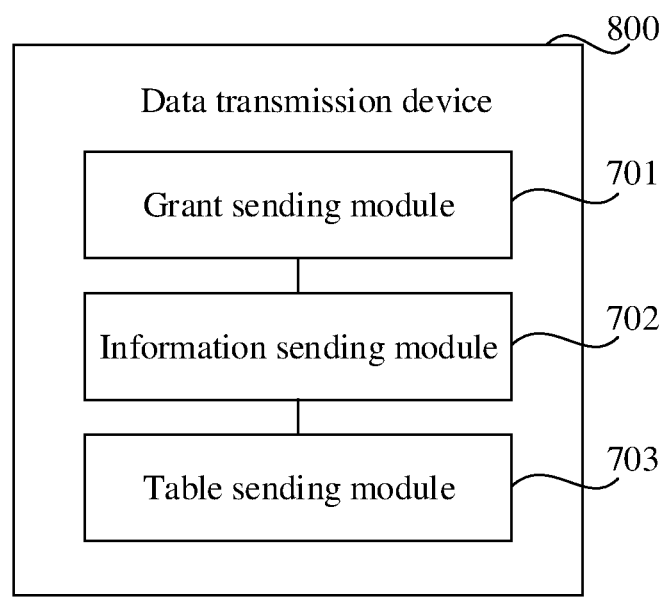
FIG. 8 is a block diagram of a data transmission device, according to an exemplary embodiment.

As illustrated in FIG. 8, an embodiment of the present disclosure also provides another data transmission device 800. Besides the modules in the data transmission device 700, the data transmission device 800 further includes a table sending module 703.

The table sending module 703 is configured to send a corresponding relationship table to the UE, and the corresponding relationship table includes at least one piece of level indication information and corresponding level of QoS. The UE is configured to query the corresponding relationship table according to the target level indication information, obtain a level of QoS corresponding to the target level indication information, and determine the level of QoS corresponding to the target level indication information as the target level of QoS.

From the above, according to the data transmission device provided in the embodiment of the present disclosure, the base station sends the target level indication information to the UE, and the target level indication information is configured to indicate the level of QoS of the data scheduled by the UL grant sent to the UE by the base station, such that the UE may acquire the target UL data according to the level of QoS and transmit the target UL data through the UL resource indicated by the UL grant, and the level of QoS of the target UL data is consistent with the level of QoS of the data scheduled by the UL grant. In such a manner, it may be ensured that the level of QoS of the UL data transmitted by the UE is consistent with the level of QoS of the data scheduled by the UL grant, such that the UL data transmission efficiency of the UE may be ensured.

With respect to the device in the above embodiment, the specific manners for performing operations for individual modules therein have been described in detail in the embodiment regarding the method, which will not be repeated herein.

Figure 9:
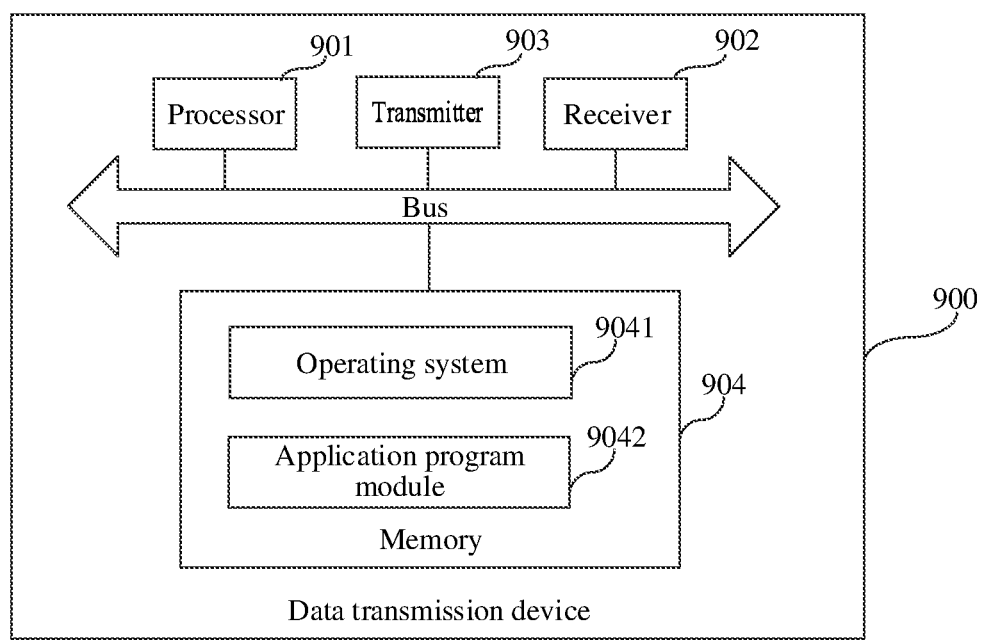
FIG. 9 is a block diagram of a data transmission device, according to an exemplary embodiment.

FIG. 9 is a block diagram of a data transmission device 900, according to an exemplary embodiment. For example, the data transmission device 900 may be a base station. As illustrated in FIG. 9, the data transmission device 900 may include a processor 901, a receiver 902, a transmitter 903 and a memory 904. The receiver 902, the transmitter 903 and the memory 904 are connected with the processor 901 through a bus respectively.

The processor 901 includes one or more than one processing core, and the processor 901 runs a software program and a module to execute the method executed by the base station in the data transmission methods provided in the embodiments of the present disclosure. The memory 904 may be configured to store the software program and the module. Specifically, the memory 904 may store an operating system 9041 and an application program module 9042 required by at least one function. The receiver 902 is configured to receive communication data sent by another device, and the transmitter 903 is configured to send communication data to the other device.

Figure 10:
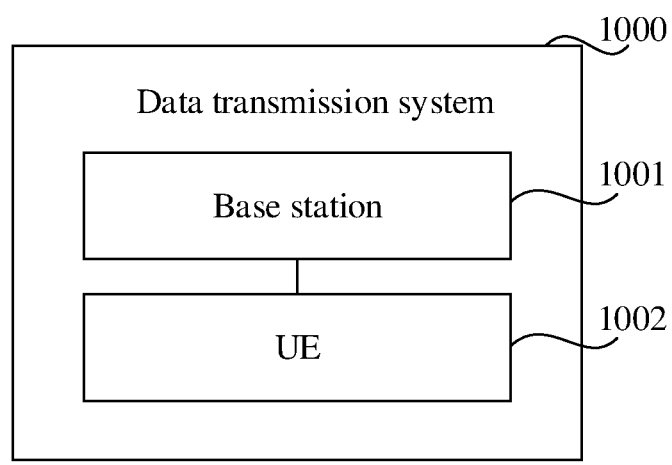
FIG. 10 is a block diagram of a data transmission system, according to an exemplary embodiment.

FIG. 10 is a block diagram of a data transmission system 1000, according to an exemplary embodiment. As illustrated in FIG. 10, the data transmission system 1000 includes a base station 1001 and UE 1002.

The base station 1001 is configured to execute the data transmission method executed by a base station in the embodiment illustrated in FIG. 4.

The UE 1002 is configured to execute the data transmission method executed by UE in the embodiment illustrated in FIG. 4.

Figure 11:
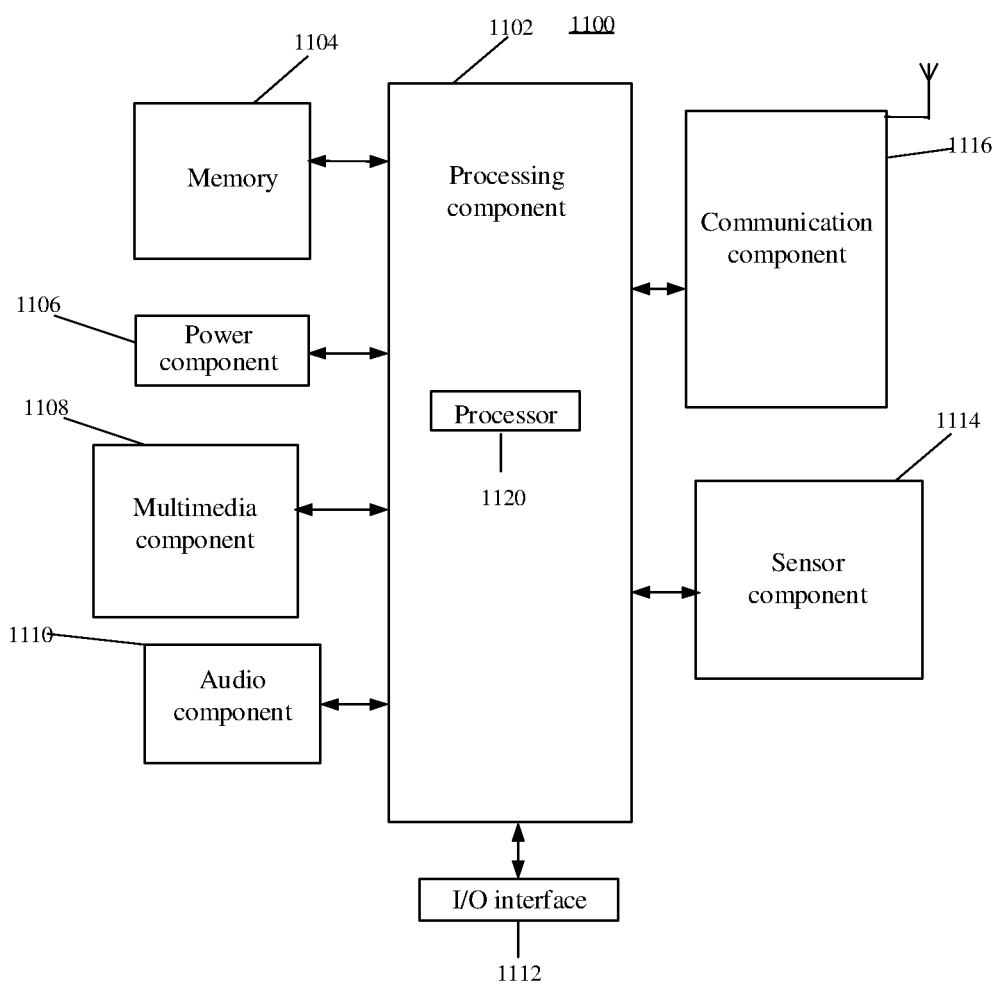
FIG. 11 is a block diagram of a data transmission device, according to an exemplary embodiment.

FIG. 11 is a block diagram of a data transmission device 1100, according to an exemplary embodiment. For example, the device 1100 may be a mobile phone, a computer, a digital broadcast terminal, a messaging device, a gaming console, a tablet, a medical device, exercise equipment, a personal digital assistant, and the like.

Referring to FIG. 11, the device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the device 1100, such as the operations associated with display, telephone calls, data communications, camera operations, and recording operations. The processing component 1102 may include one or more processors 1120 to execute instructions to perform all or part of the steps executed by the UE 20 in the method embodiments. Moreover, the processing component 1102 may include one or more modules which facilitate interaction between the processing component 1102 and other components. For instance, the processing component 1102 may include a multimedia module to facilitate interaction between the multimedia component 1108 and the processing component 1102.

The memory 1104 is configured to store various types of data to support the operation of the device 1100. Examples of such data include instructions for any applications or methods operated on the device 1100, contact data, phonebook data, messages, pictures, video, etc. The memory 1104 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 1106 provides power for various components of the device 1100. The power component 1106 may include a power management system, one or more power supplies, and other components associated with generation, management and distribution of power for the device 1100.

The multimedia component 1108 includes a screen providing an output interface between the device 1100 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 1108 includes a front camera and/or a rear camera. The front camera and/or the rear camera may receive external multimedia data when the device 1100 is in an operation mode, such as a photographing mode or a video mode. Each of the front camera and the rear camera may be a fixed optical lens system or have focusing and optical zooming capabilities.

The audio component 1110 is configured to output and/or input an audio signal. For example, the audio component 1110 includes a microphone (MIC), and the MIC is configured to receive an external audio signal when the device 1100 is in an operation mode, such as a call mode, a recording mode and a voice recognition mode. The received audio signal may further be stored in the memory 1104 or sent through the communication component 1116. In some embodiments, the audio component 1110 further includes a speaker configured to output the audio signal.

The I/O interface 1112 provides an interface between the processing component 1102 and peripheral interface modules, such as a keyboard, a click wheel, buttons, and the like. The buttons may include, but are not limited to: a home button, a volume button, a starting button and a locking button.

The sensor component 1114 includes one or more sensors configured to provide status assessments in various aspects for the device 1100. For instance, the sensor component 1114 may detect an on/off status of the device 1100 and relative positioning of components, such as a display and small keyboard of the device 1100, and the sensor component 1114 may further detect a change in a position of the device 1100 or a component of the device 1100, presence or absence of contact between the user and the device 1100, orientation or acceleration/deceleration of the device 1100 and a change in temperature of the device 1100. The sensor component 1114 may include a proximity sensor configured to detect presence of an object nearby without any physical contact. The sensor component 1114 may also include a light sensor, such as a complementary metal oxide semiconductor (CMOS) or charge coupled device (CCD) image sensor, configured for use in an imaging application. In some embodiments, the sensor component 1114 may also include an acceleration sensor, a gyroscope sensor, a magnetic sensor, a pressure sensor or a temperature sensor.

The communication component 1116 is configured to facilitate wired or wireless communication between the device 1100 and other devices. The device 1100 may access a communication-standard-based wireless network, such as a wireless fidelity (WiFi) network, a 2nd-generation (2G) or 3rd-generation (3G) network or a combination thereof. In an exemplary embodiment, the communication component 1116 receives a broadcast signal or broadcast associated information from an external broadcast management system through a broadcast channel. In an exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology and other technologies.

In an exemplary embodiment, the device 1100 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the technical process executed by the UE 20 in the method embodiments.

In an exemplary embodiment, there is also provided a non-transitory computer-readable storage medium including instructions, such as included in the memory 1104, executable by the processor 1120 of the device 1100 to complete the technical process executed by the UE 20 in the method embodiments. For example, the non-transitory computer-readable storage medium may be a ROM, a random access memory (RAM), a compact disc read-only memory (CD-ROM), a magnetic tape, a floppy disc, an optical data storage device, and the like.

In an exemplary embodiment, there is also provided a computer-readable storage medium. The computer-readable storage medium is a non-volatile computer-readable storage medium. A computer program is stored in the computer-readable storage medium. The stored computer program may be executed by a processing component to implement a data transmission method provided in the embodiments of the present disclosure. For example, the data transmission method may be as follows: after receiving a UL grant sent by a base station, a target level of QoS is determined, and the target level of QoS is a level of QoS of data scheduled by the UL grant; target UL data is acquired from UL data to be sent, and a level of QoS of the target UL data is consistent with the target level of QoS; and the target UL data is sent through a UL resource indicated by the UL grant.

Or, the data transmission method may be as follows: a UL grant is sent to UE; and target level indication information is sent to the UE, and the target level indication information is configured to indicate a target level of QoS which is a level of QoS of data scheduled by the UL grant; the UE is configured to acquire target UL data from UL data to be sent according to the target level indication information and send the target UL data through a UL resource indicated by the UL grant, and a level of QoS of the target UL data is consistent with the target level of QoS.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A data transmission method performed by user equipment (UE), comprising:
    determining a first moment when an uplink (UL) grant is received by the UE from a base station through target downlink control information (DCI);
    determining, according to the first moment, UL data to be sent by the UE at a target moment as data scheduled by the UL grant, a time interval between the target moment and the first moment being equal to a sum of a delay of UL scheduling of the base station and a delay of processing of the UL grant by the UE, the target moment being prior to the first moment; and
    determining a highest level of quality of service (QOS) of the data scheduled by the UL grant as a target level of QoS, the target level of QoS being a level of QoS of the data scheduled by the UL grant;
    acquiring target UL data from the UL data to be sent, a level of QoS of the target UL data being consistent with the target level of QoS;
    sending the target UL data through a UL resource indicated by the UL grant; and
    sending, in response to the UL data to be sent comprising no UL data with a level of QoS consistent with the target level of QoS, a rescheduling request to the base station, the rescheduling request comprising a highest level of QoS of the UL data to be sent and being configured to instruct the base station to send a new UL grant to the UE;
    wherein the UL data with the level of QoS consistent with the target level of QoS comprises: the UL data with a level of QoS equal to the target level of QoS, or part of the UL data with a level of QoS equal to the target level of QoS.

2. The method of claim 1, wherein acquiring the target UL data from the UL data to be sent comprises:
    acquiring first UL data of which a level of QoS is equal to the target level of QoS from the UL data to be sent; and
    intercepting, in response to a data volume of the first UL data greater than or equal to a capacity of the UL resource indicated by the UL grant, data in a data volume equal to the capacity of the UL resource from the first UL data, and acquiring the intercepted data as the target UL data.

3. User equipment (UE), comprising:
    a processor; and
    a memory configured to store instructions executable by the processor,
    wherein the processor is configured to:
    determine a first moment when an uplink (UL) grant is received by the UE from a base station through target downlink control information (DCI);
    determine, according to the first moment, UL data to be sent by the UE at a target moment as data scheduled by the UL grant, a time interval between the target moment and the first moment being equal to a sum of a delay of UL scheduling of the base station and a delay of processing of the UL grant by the UE, the target moment being prior to the first moment; and
    determine a highest level of quality of service (QOS) of the data scheduled by the UL grant as a target level of QoS, the target level of QoS being a level of QoS of the data scheduled by the UL grant;
    acquire target UL data from the UL data to be sent, a level of QoS of the target UL data being consistent with the target level of QoS;
    send the target UL data through a UL resource indicated by the UL grant; and
    send, in response to the UL data to be sent comprising no UL data with a level of QoS consistent with the target level of QoS, a rescheduling request to the base station, the rescheduling request comprising a highest level of QoS of the UL data to be sent and being configured to instruct the base station to send a new UL grant to the UE;
    wherein the UL data with the level of QoS consistent with the target level of QoS comprises: the UL data with a level of QoS equal to the target level of QoS, or part of the UL data with a level of QoS equal to the target level of QoS.

* * * * *